US009776176B2

(12) United States Patent
Malango et al.

(10) Patent No.: US 9,776,176 B2
(45) Date of Patent: Oct. 3, 2017

(54) CATALYST FOR SELECTIVE OXIDATION OF SULPHUR COMPOUNDS

(75) Inventors: Tomas M. Malango, Móstoles (ES); María Dolores Zafra, Móstoles (ES); Rafael Roldán, Móstoles (ES)

(73) Assignee: REPSOL, S.A., Madrid (ES)

(*) Notice: Subject to any disclaimer, the term of this patent is extended or adjusted under 35 U.S.C. 154(b) by 30 days.

(21) Appl. No.: 14/396,221

(22) PCT Filed: Apr. 23, 2012

(86) PCT No.: PCT/ES2012/070270
§ 371 (c)(1),
(2), (4) Date: Oct. 22, 2014

(87) PCT Pub. No.: WO2013/160490
PCT Pub. Date: Oct. 31, 2013

(65) Prior Publication Data
US 2015/0050204 A1  Feb. 19, 2015

(51) Int. Cl.
B01J 29/072 (2006.01)
B01J 29/76 (2006.01)
B01J 23/75 (2006.01)
B01J 21/04 (2006.01)
B01J 21/08 (2006.01)
B01J 21/12 (2006.01)
C01B 17/04 (2006.01)
B01J 37/02 (2006.01)
B01D 53/86 (2006.01)
B01J 29/24 (2006.01)
C10L 3/10 (2006.01)
C01B 17/50 (2006.01)

(52) U.S. Cl.
CPC .......... B01J 29/76 (2013.01); B01D 53/8612 (2013.01); B01J 21/04 (2013.01); B01J 23/75 (2013.01); B01J 29/072 (2013.01); B01J 29/24 (2013.01); B01J 37/0201 (2013.01); C01B 17/0465 (2013.01); C01B 17/508 (2013.01); C10L 3/103 (2013.01); B01D 2255/2092 (2013.01); B01D 2255/20746 (2013.01); B01D 2255/50 (2013.01); C10L 2290/54 (2013.01)

(58) Field of Classification Search
None
See application file for complete search history.

(56) References Cited

U.S. PATENT DOCUMENTS 3,953,587 A  4/1976 Lee et al.
5,286,697 A  2/1994 Van Der Brink et al.
2,108,981 A  3/1997 Philippe et al.
5,814,293 A  9/1998 Terorde et al.
6,024,933 A  2/2000 Legendre et al.
6,616,873 B1* 9/2003 Duraiswami ......... C04B 38/009
264/44
2005/0100495 A1  5/2005 Chapat et al.
2007/0227951 A1* 10/2007 Thirugnanasampanthar .............
C10G 21/06
208/243

FOREIGN PATENT DOCUMENTS

CN  1153136  7/1997
EP  0 242 006  10/1987
EP  1 902 769  3/2008
ES  2108981  1/1998
RU  2070089 C1  12/1996
SU  1153978  5/1985
WO  WO 00/10693  3/2000
WO  WO 2004/036598  4/2004
WO  WO 2006/090190  8/2006

OTHER PUBLICATIONS

Search Report for PCT/ES2012/070270 mailed Jan. 28, 2013, 11 pgs.
Brunauer et al., "Adsorption of Gases in Multimolecular Layers", contribution from Bureau of Chem. and Soils Wash. Univ. vol. 60, pp. 309-319 (1938).
Davydov et al., "Metal oxides in hydrogen sulfide oxidation by oxygen and sulfur dioxide", Applied Catalysis A: General 244, pp. 93-100 (2003).
Garbowski et al., "Catalytic Properties and Surface States of Cobalt-Containing Oxidation Catalysts", Applied Catalysis 64, pp. 209-224, Elsevier Science Publishers (1990).
Hamada et al., "Role of supported metals in the selective reduction of nitrogen monoxide with hydrocarbons over metal/alumina catalysts", Catalysis Today 29, pp. 53-57 (1996).
Jansson "Low-Temperature CO Oxidation over $Co_3O_4/Al_2O_3$" J. Of Catalysis 194 pp. 55-60 (2000).
Ko et al., "The sorption of hydrogen sulfide from hot syngas by metal oxides over supports", Chemosphere 58, pp. 467-474 (2005).
Sampanthar et al., "A novel oxidative desulfurization process to remove refractory sulfur compounds from diesel fuel", Applied Catalysis Environmental 63, pp. 85-90 (2006).
"Standard Test Method for Determining Pore Volume Distribution of Catalysts by Mercury Intrusion Porosimetry", ASTM Designation D 4284-03, 7 pgs (2003).
"Standard Test Method for Single Pellet Crush Strength of Formed Catalyst Shapes", ASTM Designation D 4179-01, 3 pgs (2002).
"Standard Test Method for Surface Area of Catalysts and Catalyst Carriers", ASTM Designation D 3663-03, 5 pgs (2003).

(Continued)

Primary Examiner — Daniel Berns
(74) Attorney, Agent, or Firm — Squire Patton Boggs (US) LLP

(57) ABSTRACT

The present invention is related to a catalyst supported for the selective oxidation of sulphur compounds of the tail gas from the Claus process or streams with an equivalent composition to elemental sulphur or sulphur dioxide ($SO_2$). It is also the object of the present invention, a process for the preparation of a catalyst of this type, as well as the process of selective oxidation of sulphur compounds to elemental sulphur using the catalyst of the invention, as well as the process of catalytic incineration of the tail gas from the Claus process using the catalyst of the present invention.

14 Claims, No Drawings

(56) References Cited

OTHER PUBLICATIONS van Nisselrooy et al., "SUPERCLAUS reduces SO, emission by the use of a new selective oxidation catalyst", Catalysis Today 16, pp. 263-271 (1993).
Criterion Catalyst Co., Ltd. C-099 Operating Guide, 16 pages, Oct. 31, 2014.
Sampanthar, et al., "A novel oxidative desulfurization process to remove refractory sulfur compounds from diesel fuel", Applied Catalysis B: Environmental, Mar. 2006, vol. 63, pp. 85-93, 9 pages.
Batygina, et al., "Studies of supported oxide catalysts in the direct selective oxidation of hydrogen sulfide", Rection Kinetics and Catalysis Letters, Jul. 1992, vol. 48, No. 1, pp. 55-63, 9 pages.

\* cited by examiner

CATALYST FOR SELECTIVE OXIDATION OF SULPHUR COMPOUNDS

The present invention is related to a catalyst for selective oxidation of sulphur compounds to elemental sulphur and/or to $SO_2$ comprising a catalytically active material supported on a support material; a process for the preparation of said catalyst, as well as its use in a selective oxidation process of sulphur compounds to elemental sulphur and in a catalytic incineration process to $SO_2$.

STATE OF THE PRIOR ART

One of the better known methods for converting hydrogen sulphide into non-harmful elemental sulphur is the so-called Claus process. In said process, first approximately one third of the fed $H_2S$ is burned, whereby is formed $SO_2$. Thanks to the combustion conditions, the majority of the organic polluting substances of the gas stream are also burned. Residual $H_2S$ reacts with the $SO_2$ formed, first thermally and, later, in the presence of a catalyst to form water and elemental sulphur, according to the following reaction:

$$2H_2S + SO_2 \leftrightarrow 2H_2O + 3/nSn$$

However, in the Claus process, $H_2S$ does not quantitatively turn into elemental sulphur, mainly as a result of the balance nature of the Claus reaction:

$$2H_2S + SO_2 \leftrightarrow 2H_2O + 3/nSn$$

The need to reduce emissions into the atmosphere of sulphur compounds from sulphur recovery plants is known. For this, various treatment processes of the tail gas of the sulphur recovery processes have been developed. These processes include primarily three: hydrogenation of sulphur compounds and absorption with amine of the hydrogen sulphide ($H_2S$), Claus processes in liquid phase and processes of selective oxidation of sulphur compounds to elemental sulphur.

Selective oxidation processes of sulphur compounds to elemental sulphur take place according to the following reaction $$H_2S + \tfrac{1}{2}O_2 \leftrightarrow S + H_2O$$

in the presence of a residual content of $H_2O$ and $SO_2$.

The catalytic incineration of the sulphur compounds to $SO_2$ is also known, particularly of the $H_2S$ remaining in the tail gas from the Claus process. The four main reactions that take place in the catalytic incineration of the tail gas from the Claus process are:

$$H_2S + \tfrac{1}{2}O_2 \leftrightarrow H_2O + SO_2$$

$$S_8 + 8O_2 \leftrightarrow 8SO_2$$

$$CS_2 + 3O_2 \leftrightarrow CO_2 + 2SO_2$$

$$COS + \tfrac{1}{2}O_2 \leftrightarrow CO_2 + SO_2$$

In the SuperClaus process, according to the patent of Comprimo B.V. EP242006, $H_2S$ is separated from the Claus process gas over a solid catalyst by oxidation to obtain sulphur steam. The generally used commercial catalyst contains as active phase iron oxide. The catalyst is highly selective to direct oxidation of $H_2S$ and converts more than 80% to elemental sulphur. Little $SO_2$ is formed, even in the presence of excess air, taking place a slight Claus reaction in the opposite direction due to the low sensitivity of the catalyst to water, likewise there is no oxidation of CO and $H_2$, and also there is no formation of COS and $CS_2$.

On the other hand, catalysts have been described for carrying out catalytic incineration of the tail gas or residual conversion of sulphur compounds into $SO_2$ before their exit through the stack. These catalysts are based on vanadium oxides or with a 3% Bi and 1% Cu content in the form of sulphates supported on alumina.

In the paper DAVYDOV, A., et al. Metal oxides in hydrogen sulfide oxidation by oxygen and sulphur dioxide I. The comparison study of the catalytic activity. Mechanism of the interactions between $H_2S$ and $SO_2$ on some oxides. *Applied Catalysis A: General.* 2003, vol. 244, no. 1, p. 93-100, the catalytic activity of various metal oxides in the Claus reaction and in the oxidation of $H_2S$ is studied. Studied catalysts consist of not supported metal oxides.

In addition, catalysts for different applications where the catalytically active phase is a cobalt oxide are known. Thus, in the paper HIDEAKI, HAMADA, et al. Role of supported metals in the selective reduction of nitrogen monoxide with hydrocarbons over metal/alumina catalysts, *Catalysis Today*, 1996, vol. 29, no. 1-4, p. 53-57, the effect of a catalyst for the reduction of nitrogen monoxide is described, where said catalytic consists of $CoO/Al_2O_3$ or $FeO/Al_2O_3$. It is indicated that the employed alumina is an alumina with a surface area of 189 $m^2/g$; however, details about other key features that characterize the catalyst such as the average pore diameter, pore volume or crush strength are not provided. In the paper JANSSON, J. Low-Temperature CO Oxidation over $Co_3O_4/Al_2O_3$, *Journal of Catalysis.* 2000. vol. 194, no. 1, p. 55-60, the use of a $Co_3O_4/\gamma\text{-}Al_2O_3$ catalyst for catalytic oxidation of CO at room temperature is described. In the paper GARBOWSKI, E., et al. Catalytic properties and surface states of cobalt-containing oxidation catalysts. *Applied Catalysis.* 1990. vol. 64, no. 1-2, p. 209-24, catalytic oxidation of $CH_4$ over several catalysts consisting of $Co_3O_4$ deposited on several supports of the $Al_2O_3$ type is described.

Thus, there is still the need for a catalyst having improved activity and selectivity with respect to the data reported by the available catalysts that allow achieving suitable yields, reducing the operating temperature conditions with the consequent industrial benefit, mainly in terms of energy efficiency, that said reduction entails.

EXPLANATION OF THE INVENTION

The present invention provides a catalyst for selective oxidation of sulphur compounds, comprising a catalytically active material supported on a support material, where the support material comprises an aluminium oxide (alumina), a silicon oxide (silica), an aluminium-silicon mixed oxide (aluminosilicate) or mixtures thereof; and where the catalytically active material consists of cobalt oxide, which is supported on said support material.

The catalyst according to the present invention has a specific surface area, measured by nitrogen porosimetry according to the ASTM D-3663 standard (year 2003) and consisting of determining the specific surface area of a catalyst or support by measuring the pressure required to adsorb an established volume of nitrogen, comprised from 10 to 150 $m^2/g$, preferably from 20 to 140 $m^2/g$; a pore volume, measured by mercury intrusion porosimetry, according to the ASTM D-4284 standard (year 2003) and consisting of determining the distribution of pore volumes of catalysts in relation with the apparent diameters of the entry of said pores by measuring the volume of mercury introduced in the same at different levels of external pressure, comprised from 0.05 to 10 cc/g, preferably 0.1 to 5 cc/g; the average pore diameter, also measured by mercury intrusion porosimetry, according to the ASTM D-4284 standard (year 2003) is comprised from 2 to 50 nm, preferably from 5 to 40 nm; and it has a crush strength, measured according to the ASTM D-4179 standard (year 2002) consisting of placing a particle of a representative sample between two flat surfaces and measuring the compression force applied for its rupture, higher than 3 Kp, preferably higher than 5 Kp.

The pore volume reflects the amount of void space that exists in the catalyst. The specific surface area of a support reflects the active or available area for the deposition of an active phase that said support has. The determination of both is carried out by porosimetry and depending on the fluid used greater or lesser size pores will be included. For samples with pores in the micropore range (diameter<2 nm), this volume (and its corresponding distribution of sizes) is obtained by means of nitrogen adsorption isotherms. To determine the distribution of pore sizes and its volume in the meso and macroporosity range (diameter 2-50 nm and >50 nm respectively) mercury porosimetry is used. The diameter of pores is also determined with mercury porosimetry. The method used in the mercury porosimetry to determine the volume and diameter of pores follows the ASTM D-4284 standard. The specific surface area is obtained through nitrogen porosimetry using the BET method. The method used in nitrogen porosimetry to determine the specific surface area follows the ASTM D-3663 standard.

The crush strength determines the pressure to be exercised (by unit of length) to break a catalyst particle without crushing it. Basically catalysts with spheres, pellets, extrudates, monoliths, etc shapes are used. Is it determined by a method based on the ASTM D-4179 standard.

Among sulphur compounds that are susceptible of being selectively oxidized in the presence of the catalyst of the present invention those that are present in natural gas, a gas from refinery, a synthesis gas, a tail gas from a process of recovery of sulphur, as for example the tail gas from the Claus process, or a gas from a previous partial oxidation of a gas relatively rich in $H_2S$ in which a substantial portion of $H_2S$ was oxidized to elemental sulphur followed by the separation of the same from said elemental sulphur can be mentioned.

Thus, sulphur compounds the selective oxidation of which is carried out in the presence of the catalyst of the present invention include hydrogen sulphide ($H_2S$), carbonyl sulphide (COS) and carbon disulphide ($CS_2$).

In addition to aluminium oxide, silicon oxide, aluminium-silicon mixed oxide or mixtures thereof, the support material of the catalyst can comprise a binder or agglomerant. While their presence is not essential for the preparation of the catalysts according to the present invention, according to an embodiment said binder or agglomerant can be present in an amount comprised from 0% to 99%, preferably in an amount from 0% to 20%, being particularly preferred an amount from 0% to 10% by weight with respect to the total weight of the support material. In a particular embodiment, the support material comprises a binder or agglomerant in an amount comprised from 1% to 10% by weight, with respect to the total weight of the support material. Among binders that can be used in forming the support material, according to the present invention materials such as alumina, silica, or natural clay, such as kaolin or bentonite can be mentioned.

The use of binders in the forming of the support material according to the present invention is especially useful in the case of support materials of the silicon oxide type.

As mentioned above, according to the present invention, the catalytically active material supported on the support material present in the catalyst is cobalt oxide, which can exist as different phases in the form of cobalt oxide (II) (CoO), cobalt oxide (III) ($Co_2O_3$), cobalt oxide (II, III) ($Co_3O_4$), and other less stable phases such as cobalt oxyhydroxide (CoO(OH)) or other cobalt oxide ($CoO_2$). There may also be mixture thereof in a same material. In a particular embodiment, the catalytically active material is a mixture of CoO and $Co_3O_4$ in a ratio of between 10:1 to 1:10 by weight.

The amount of cobalt oxide (catalytically active material) supported on the support material of the catalyst according to the present invention is comprised from 0.05% to 5% by weight, preferably from 0.1% to 2%. Said percentage indicates the amount of metal (Co) based on the total weight of the support material.

The fundamental advantages of supporting the active phase (cobalt oxide) on a support are the dispersion of the active phase, which allows improving the selectivity of the catalyst, and the mechanical resistance.

As mentioned above, the support material comprises an aluminium oxide (alumina), a silicon oxide (silica), an aluminium-silicon mixed oxide (aluminosilicate) or mixtures thereof, and it may optionally contain other materials that allow to properly form said support material for the preparation of the catalyst.

According to an embodiment of the present invention, the support material is selected from the group formed by at least one natural aluminosilicate, at least one alumina and mixtures thereof. According to a particular embodiment, the support material is an aluminium-silicon mixed oxide (aluminosilicate), said aluminosilicate being preferably a natural zeolite. According to another particular embodiment, the support material is an aluminium oxide (alumina).

According to another particular embodiment, the support material is a mixture of at least one natural zeolite and at least one alumina. Being particularly preferred, when the support material is a natural zeolite or an alumina.

Thus, according to a particular embodiment of the present invention, the support material is a natural zeolite. Therefore, according to said embodiment, the support material only consists of a natural zeolite, optionally in the presence of an adjuvant, preferably a binder, containing no alumina as additional support material.

According to a preferred embodiment, when the support material is a natural zeolite, it is selected from analcite, cabasite, ferrierite, laumontite, gismondite, epistilbite, erionite, clinoptilolite, heulandite, natrolite, phillipsite, harmotome, mordenite, morolenite, thomsonite and stilbite; clinoptilolite being particularly preferred.

The term clinoptilolite as it is understood in the context of the present invention refers to three distinct species, or a mixture thereof:

Clinoptilolite-Ca: $Ca_3(Si_{30}Al_6)O_{72}.20H_2O$
Clinoptilolite-K: $K_6(Si_{30}Al_6)O_{72}.20H_2O$
Clinoptilolite-Na: $Na_6(Si_{30}Al_6)O_{72}.20H_2O$ According to a more preferred embodiment, the support material comprises a mixture of all three species previously mentioned.

A particular embodiment of the present invention is related to a catalyst for selective oxidation of compounds that contain sulphur comprising:

a support material comprising a natural zeolite, which is preferably selected from analcite, cabasite, ferrierite, laumontite, gismondite, epistilbite, erionite, clinoptilolite, heulandite, natrolite, phillipsite, harmotome, mordenite, morolenite, thomsonite and stilbite; clinoptilolite being particularly preferred; where said support material does not contain any alumina;

a catalytically active material consisting of cobalt oxide, which is supported on said support material; cobalt oxide being selected from CoO, $Co_2O_3$, $Co_3O_4$, $CoO_2$, CoO(OH), or mixtures thereof, preferably it is a mixture of CoO and $Co_3O_4$, more preferably a mixture of CoO and $Co_3O_4$ in a ratio by weight between 10:1 to 1:10; and where the catalyst has the following properties:

a specific surface area measured with nitrogen porosimetry, according to the ASTM D-3663 standard, comprised from 10 to 150 m²/g, preferably from 20 to 140 m²/g;

a pore volume, measured with mercury intrusion porosimetry, according to the ASTM D-4284 standard, comprised from 0.05 to 10 cc/g, preferably 0.1 to 5 cc/g;

an average pore diameter, determined by nitrogen porosimetry, according to the ASTM D-4284 standard, comprised from 2 to 50 nm, preferably from 5 to 40 nm and a crush strength, determined according to the ASTM D-4179 standard, higher than 3 Kp, preferably higher than 5 Kp.

According to another preferred embodiment, the support material is alumina. Preferably, said support material comprises at least one alumina selected from the α-, χ-, η-, δ-, κ-, θ-, γ-, ω-, and ρ-alumina forms. Being particularly preferred the θ-alumina (theta-alumina) form.

A particular embodiment of the present invention is related to a catalyst comprising alumina as support material and a catalytically active material consisting of cobalt oxide, which is supported on said support material; cobalt oxide being selected from CoO, $Co_2O_3$, $Co_3O_4$, $CoO_2$, CoO(OH), or mixtures thereof, preferably it is a mixture of CoO and $Co_3O_4$, more preferably a mixture of CoO and $Co_3O_4$ in a ratio by weight of between 10:1 to 1:10;

where the catalyst has the following properties:

a specific surface area measured with nitrogen porosimetry, according to the ASTM D-3663 standard, comprised from 10 to 150 m2/g, preferably from 20 to 140 m2/g;

a pore volume, measured with mercury intrusion porosimetry, according to the ASTM D-4284 standard, comprised from 0.05 to 10 cc/g, preferably 0.1 to 5 cc/g;

an average pore diameter, determined by nitrogen porosimetry, according to the ASTM D-4284 standard, comprised from 2 to 50 nm, preferably from 5 to 40 nm and a crush strength, determined according to the ASTM D-4179 standard, higher than 3 Kp, preferably higher than 5 Kp.

The catalysts of the present invention have a higher activity (conversion of sulphur compounds, mainly $H_2S$) and a selectivity similar to those achieved by the catalysts described in the literature, both for the reaction of oxidation of sulphur compounds (mainly $H_2S$) to elemental sulphur (having a high conversion to elemental sulphur and low activity in the reverse Claus reaction), and for the reaction of catalytic incineration of sulphur compounds (mainly $H_2S$, COS and $CS_2$) to $SO_2$.

The use of the catalysts of the present invention allows to achieve sulphur yields higher than those of the existing catalysts consisting of compounds of iron and chromium with an alkali metal as promoter and supported on α-alumina or silica, as described in the patent U.S. Pat. No. 5,814,293, operating at temperatures below the commercial catalyst described in said patent. This is an improvement of the energy efficiency of the process by reducing the need for heating the tail gas before entering the reactor.

On the other hand, the catalysts of the present invention have a suitable mechanical resistance, as well as a resistance to the most frequently deactivations in these processes (thermal, hydrothermal and sulfidation).

The use of the catalyst according to the present invention in the selective oxidation of sulphur compounds present in a gas stream, allows advantageously carrying out the selective oxidation of the Claus process tail gasses containing hydrogen sulphide.

In addition to a high selectivity, the process can be carried out without the reduction or elimination of water in the gas stream before oxidation; being able to carry out the oxidation process with water contents of up to 30%.

In principle, catalysts according to the present invention can be prepared using processes known for the preparation of catalysts on support. Preferably, the catalytically active material, cobalt oxide, is supported by means of impregnation on the support material.

A process for the preparation of the catalyst of the present invention comprises the impregnation of a solution of a precursor cobalt salt on the surface of a support material comprising aluminium and/or silicon oxide, followed by drying and calcination of the support material.

According to a preferred embodiment, a cobalt precursor salt is used selected from cobalt acetate, cobalt nitrate and cobalt citrate. According to another embodiment of the present invention, the calcination of the support material after its impregnation with a cobalt salt solution is carried out at a temperature comprised from 250 to 450° C.

Calcination is carried out preferably from 250 a 400° C. and more preferably from 280 to 350° C.

According to a particular embodiment of the present invention, the catalysts are prepared by impregnation for at least 30 minutes with a solution of a cobalt precursor salt on a formed support, with a size from 1 to 7 mm.

According to another aspect of the present invention, it provides a process for the selective oxidation of compounds that contain sulphur, in particular hydrogen sulphide, into elemental sulphur with the use of the catalyst according to the invention.

According to this process hydrogen sulphide is oxidized, directly into elemental sulphur, passing a gas stream containing sulphur compounds, along with a gas stream containing oxygen, over the catalyst according to the present invention, at elevated temperature; after the catalytic oxidation process a gaseous effluent is recovered containing a reduced content of $H_2S$.

In the process of selective oxidation of sulphur compounds to elemental sulphur according to a particular embodiment of the present invention, the gas stream containing said sulphur compounds is a natural gas, a gas from refinery, a synthesis gas, a tail gas from a process of recovery of sulphur, as for example the tail gas from the Claus process, or a gas from a previous partial oxidation of a gas relatively rich in $H_2S$ in which a substantial portion of $H_2S$ was oxidized to elemental sulphur followed by the separation of the same from said elemental sulphur.

According to a particular embodiment, from the process of oxidation of sulphur compounds to elemental sulphur, said gas stream containing sulphur compounds comprises from 0.01 to 4% by weight of $H_2S$, preferably from 0.1 to 2% by weight of $H_2S$, being more preferred from 0.5 to 1.5% by weight.

The process of oxidation of sulphur compounds into elemental sulphur is carried out by catalytic combustion of the gas containing hydrogen sulphide with oxygen or a gas containing a suitable amount of oxygen such that the molar ratio of oxygen to hydrogen sulphide is comprised from 1 to 5, preferably from 1 to 3.

According to an embodiment of the present invention, in said process of selective oxidation of sulphur compounds into elemental sulphur, the inlet temperature to the catalyst bed is comprised from 150 to 240° C., preferably from 155 to 200° C., being particularly preferred a temperature comprised from 170 to 195° C. As for the outlet temperature, this will be from 35 to 90° C. higher than the inlet temperature.

In said process, the reactor will operate with a space velocity, GHSV (gas hourly space velocity), comprised from 500 to 2000 l/h. Said space velocity, GHSV, is defined as the ratio between the volume of supply gas in $Nm^3/h$ and the volume of catalyst in $m^3$. In addition, the reactor will operate at a pressure comprised from 0.01 to 10 bar·g, preferably from 0.05 to 1 bar g, more preferably from 0.05 a 0.25 bar g.

According to a particular embodiment of the process of oxidation of sulphur compounds into elemental sulphur according to the present invention, the quality of the load shall have the following values:

from 0.01 to 4% of $H_2S$; preferably from 0.5 to 1.5%;
from 0.01 to 5% $O_2$, preferably from 1 to 3%
from 0.01 to 1% $SO_2$, preferably from 0.2 a 0.5%
from 0.01 to 5% $CO_2$, preferably from 0.5 to 2%
from 0.01 to 3% CO, preferably from 0.1 to 1%
from 0.01 to 10% $H_2$, preferably from 2.5 to 5%
from 10 to 50% $H_2O$, preferably from 25 to 35%
$N_2$ rest.

According to an embodiment of the present invention, said process of selective oxidation of sulphur compounds into elemental sulphur is carried out with a gas stream containing sulphur compounds comprising from 0.01 to 4% of $H_2S$; and the inlet temperature of the gas stream to the catalyst bed containing the sulphur compounds, is comprised from 150 to 240° C. with the purpose of converting at least a part of the $H_2S$ present in said gas stream into elemental sulphur.

The process preferably has yields higher than 50%, more preferably higher than 60%, higher than 75%, higher than 80%, being particularly preferred a yield higher than 90%.

In a preferred embodiment of the process of selective oxidation of sulphur compounds into elemental sulphur according to the present invention, the gas stream containing sulphur compounds is a tail gas from the Claus process.

According to another aspect of the present invention, it provides a process for catalytic oxidation (incineration) of sulphur compounds, preferably $H_2S$, COS and $CS_2$, to $SO_2$ (incineration to $SO_2$), with the use of the catalyst according to the invention.

According to a particular embodiment, of the oxidation process of sulphur compounds to $SO_2$, said gas stream containing sulphur compounds comprises from 0.01 to 4% of $H_2S$, preferably from 0.05 to 3% of $H_2S$, being more preferred from 0.05 to 1.5%.

According to said process of catalytic incineration of sulphur compounds to $SO_2$, the process can be carried out at an inlet temperature comprised from 210 to 400° C., preferably from 240 to 350° C.

In said catalytic incineration process of sulphur compounds to $SO_2$, the reactor will operate with GHSV comprised from 500 to 10000 l/h, preferably from 1000 and 5000 l/h; a pressure of from 0.01 to 10 bar·g, preferably from 0.01 to 1 bar g. According to a particular embodiment of the catalytic incineration process of sulphur compounds to $SO_2$ according to the present invention, the quality of load will have the following values:

from 0.01 to 4% of $H_2S$; preferably from 0.05 to 1.5%;
from 0.01 to 5% $O_2$, preferably from 1 to 3%
from 0.01 to 2% $SO_2$, preferably from 0.3 to 0.8%
from 0.01 to 5% $CO_2$, preferably from 0.5 to 2%
from 0.01 to 3% CO, preferably from 0.1 to 1%
from 0.01 to 10% $H_2$, preferably from 2.5 to 5%
from 10 to 50% $H_2O$, preferably from 25 to 35%
$N_2$ rest.

According to an embodiment of the present invention, said catalytic incineration process takes place in a selective manner, where the formation of $SO_3$ takes place in an amount lower than 0.05%, preferably lower than 0.01%.

According to an embodiment of the present invention, said catalytic incineration process of sulphur compounds to $SO_2$ is carried out with a gas stream containing sulphur compounds comprising from 0.01 to 4% of $H_2S$; and the inlet temperature of the gas stream containing the sulphur compounds is comprised from 210 to 400° C. with the purpose of converting at least a part of the sulphur compounds present in said gas stream into $SO_2$. Preferably, the gas stream contains sulphur compounds comprising from 0.05 to 1.5% of $H_2S$; and the inlet temperature of the gas stream containing the sulphur compounds is comprised from 240 to 350° C. The process preferably has an $SO_2$ yield higher than 70%, more preferably higher than 80%, higher than 90%, being particularly preferred a yield higher than 95%.

In a preferred embodiment of the process of selective oxidation of sulphur compounds into elemental sulphur according to the present invention, the gas stream containing sulphur compounds is from a gas resulting from a previous partial oxidation of a gas relatively rich in $H_2S$ in which a substantial portion of $H_2S$ was oxidized to elemental sulphur followed by the separation of the same from said elemental sulphur. Preferably, said previous partial oxidation is carried out contacting a gas stream containing the sulphur compounds with a gas stream containing oxygen in the presence of a catalyst according to the present invention.

According to an embodiment of the catalytic incineration process of sulphur compounds to $SO_2$, said gas relatively rich in $H_2S$ is a natural gas, a gas from refinery, a synthesis gas, a tail gas from a process of recovery of sulphur, as for example the tail gas from the Claus process.

According to another aspect of the present invention, it provides a process for the reduction of hydrogen sulphide from a gas stream, characterized by comprising subjecting said gas stream to a Claus process and subsequently subjecting the tail gas of said Claus process to a selective oxidation process of sulphur compounds, such as it has been described previously, in the presence of the catalyst of the present invention.

DEFINITIONS

Within the framework of the invention specific surface area area (BET) is understood as the surface area as defined in S. Brunauer, P. H. Emmett and E. Teller, J. Am. Chem. Soc., 1938, 60, 309. It has been determined through nitrogen porosimetry according to the ASTM D-3663 standard.

The pore volume reflects the void space that exists in the pores of the catalyst. The pore volume was determined by applying mercury porosimetry according to the ASTM D-4284 standard.

The average pore diameter is the average of the diameter of the pores of the catalyst. It has been determined through mercury porosimetry according to the ASTM D-4284 standard.

The crush strength indicates the pressure to be exercised (by unit of length) to break a catalyst particle without crushing it. It is determined following the method indicated in the ASTM D-4179 standard.

The term conversion refers to:

Conversion=[($H_2S$+COS+$CS_2$)inlet−($H_2S$+COS+$CS_2$) outlet]/($H_2S$+COS+$CS_2$)inlet The term selectivity to sulphur refers to:

Selectivity to S=1−{($SO_2$ outlet−$SO_2$ inlet)/[$H_2S$+COS+$CS_2$]inlet−($H_2S$+COS+$CS_2$)outlet]}

The term selectivity to $SO_2$ refers to:

Selectivity to $SO_2$={($SO_2$ outlet−$SO_2$ inlet)/[$H_2S$+COS+$CS_2$]inlet−($H_2S$+COS+$CS_2$)outlet]}

While the term sulphur yield refers to:

S yield=Conversion×Selectivity to S; $SO_2$ yield=Conversion×Selectivity to $SO_2$ Throughout the description and claims the word "comprises" and its variants are not intended to exclude other technical features, additives, components or steps. For the skilled in the art, other objects, advantages and features of the invention will emanate in part from the description and in part from the practice of the invention. The following examples and drawings are provided by way of illustration, and are not intended to be limiting of the present invention. In addition, the present invention covers all the possible combinations of particular and preferred embodiments indicated here.

EXAMPLES

Example 1

Preparation of the Catalyst a. 650 Kg of alumina were impregnated for 30 minutes with an aqueous solution of cobalt acetate, with a sufficient concentration to obtain the desired final content. Later it was proceeded to the draining and drying with air flow at a temperature of 170° C. for four hours. After the drying process it was subjected again to a heat treatment in calcination kiln of 300° C. for four hours, thus leaving the catalyst prepared for use.

b. 800 Kg of a natural zeolite, clinoptilolite or mordenite, previously calcined at 300° C. for 4 hours, which were impregnated for 30 minutes with an aqueous solution of cobalt acetate, with a sufficient concentration to obtain the desired final content. Later it proceeded to the draining and drying with air flow at a temperature of 170° C. for four hours. After the drying process it was subjected again to a heat treatment in calcination kiln of 300° C. for four additional hours, thus leaving the catalyst prepared for use.

Example 2

$H_2S$ to S Process

In all the cases a gas containing 1% of $H_2S$, 2% of $O_2$, 0.35% of $SO_2$ and $N_2$ rest on dry basis and additional 25% of water was fed.

A stream containing $H_2S$ was subjected to a process of catalytic oxidation for its conversion into elemental sulphur in the presence of the catalyst previously obtained according to the example 1, obtaining the following results.

a. With Cobalt Oxide Supported on theta-Alumina

| Example 2.a | | | | |
|---|---|---|---|---|
| GHSV ($h^{-1}$) | 1000 | 1000 | 1000 | 1000 |
| T (° C.) | 225 | 230 | 235 | 240 |
| Conversion (%) | 88.2 | 85.5 | 91.6 | 93.2 |
| Selectivity (%) | 77.2 | 83.8 | 86.9 | 67.5 |
| S Yield (%) | 68.1 | 71.6 | 79.6 | 62.9 | b. With Cobalt Oxide Supported on Clinoptilolite

| Example 2.b | | | | | |
|---|---|---|---|---|---|
| GHSV (h−1) | 1000 | 1000 | 1000 | 1000 | 2000 |
| T (° C.) | 220 | 225 | 230 | 235 | 225 |
| Conversion (%) | 77.3 | 71.0 | 94.1 | 94.7 | 64.6 |
| Selectivity (%) | 91.7 | 94.7 | 98.9 | 90.7 | 89.9 |
| S Yield (%) | 70.9 | 94.2 | 93.1 | 85.9 | 58.1 |

Example 3

Comparative Example of the $H_2S$ to S Process a. Commercial catalyst of iron oxide on alumina (Catalysis Today, 16 (1993), 263-271)

| Example 3.a | |
|---|---|
| GHSV (h−1) | 1000 |
| T (° C.) | 225-275 |
| S Yield (%) | 80-90% | b. Only Clinoptilolite

| Example 3.b | | | |
|---|---|---|---|
| GHSV ($h^{-1}$) | 1000 | 1000 | 1000 |
| T (° C.) | 245 | 255 | 265 |
| Conversion (%) | 82.5 | 86.5 | 88.6 |
| Selectivity (%) | 52.1 | 81.3 | 92.2 |
| S Yield (%) | 48.2 | 78.5 | 90.9 |

Example 4

Incineration Process to $SO_2$

A gas containing 1% of $H_2S$, 2% of $O_2$, 0.35% of $SO_2$ and $N_2$ rest on dry basis and additional 25% of water was fed.

Said stream was subjected to a catalytic incineration process for its conversion into elemental sulphur in the presence of the catalyst previously obtained according to the example 1, obtaining the following results.

a. With Cobalt Oxide Supported on theta-Alumina

| Example 4.a | | | | |
|---|---|---|---|---|
| GHSV (h−1) | 1000 | 1000 | 1000 | 1000 |
| T (° C.) | 270 | 275 | 280 | 285 |
| Conversion (%) | 98.6 | 99.5 | 99.5 | 99.5 |
| Selectivity (%) | 90.9 | 95.7 | 91.2 | 86.9 |
| SO2 Yield (%) | 89.6 | 95.2 | 90.7 | 86.5 |

Example 5

Comparative Example of the Incineration Process to $SO_2$ a. Cu—Bi Commercial Catalyst on Alumina (Catalyst C-099 from Criterion Catalysts Co. Ltd., Reference C-099 Operating Guide).

As it is described in the above-mentioned document, a gas containing 0.2% of $H_2S$, 2% of $O_2$, 0.1% of $SO_2$, 0.2% of CO, 1.3% $H_2$ and $N_2$ rest on dry basis and additional 15% of water was fed. Said stream was subjected to a catalytic incineration process for its conversion into elemental sulphur in the presence of the commercial catalyst C-099 from Criterion Catalysts Co., Ltd., obtaining the following results.

| Example 5.a | | |
|---|---|---|
| GHSV (h−1) | 5000 | 5000 |
| T (° C.) | 300 | 400 |
| Conversion (%) | 99.8 | 99.8 |
| Selectivity (%) | 99.9 | 100 |
| SO2 Yield (%) | 99.7 | 99.8 |

From the results of the examples described above it can be concluded that the catalyst object of the invention is more active than the existing ones because it achieves similar yields with temperatures between 25 and 40° C. lower, representing a substantial improvement of the energy efficiency of the process.

REFERENCES CITED IN THE APPLICATION

EP242006
U.S. Pat. No. 5,814,293
DAVYDOV, A., et al. Metal oxides in hydrogen sulfide oxidation by oxygen and sulphur dioxide I. The comparison study of the catalytic activity. Mechanism of the interactions between $H_2S$ and $SO_2$ on some oxides. Applied Catalysis A: General. 2003, vol. 244, no. 1, p. 93-100.
HIDEAKI, HAMADA, et al. Role of supported metals in the selective reduction of nitrogen monoxide with hydrocarbons over metal/alumina catalysts. Catalysis Today. 1996, vol. 29, no. 1-4, p. 53-57
JANSSON, J. Low-Temperature CO Oxidation over $Co_3O_4$/$Al_2O_3$. Journal of Catalysis. 2000. vol. 194, no. 1, p. 55-60.
GARBOWSKI, E., et al. Catalytic properties and surface states of cobalt-containing oxidation catalysts. Applied Catalysis. 1990. vol. 64, no. 1-2, p. 209-24.
ASTM-D-4284
ASTM-D-3663
ASTM-D-4179
U.S. Pat. No. 5,814,293
BRUNAUER S. et al., J. Am. Chem. Soc., 1938, 60. 309
Catalysis Today, 16 (1993), 263-271
Criterion Catalysts Co. Ltd., C-099 Operating Guide

The invention claimed is:

1. A catalyst for selective oxidation or incineration of compounds containing sulphur which are contained in a gas stream, the catalyst consisting of
   a support material comprising clinoptilolite and a binder or agglomerant in an amount from 0% to 99% by weight with respect to the total weight of the support material; and
   a catalytically active material consisting of cobalt oxide, which is supported on said support material; the cobalt content in the catalyst being comprised from 0.05% to 2% by weight based on the total weight of the support material;
where the catalyst has the following properties:
   a specific surface area, measured with nitrogen porosimetry according to the ASTM D-3663 standard year 2003, and using the BET method, comprised from 10 to 150 $m^2/g$;
   a pore volume, measured with mercury intrusion porosimetry according to ASTM D-4284 standard year 2003, comprised from 0.05 to 10 cc/g;
   an average pore diameter, measured with mercury intrusion porosimetry according to ASTM D-4284 standard year 2003, comprised from 2 to 50 nm; and
   a crush strength measured according to the ASTM D-4179 standard year 2002, higher than 29.42 N.

2. The catalyst according to claim 1, wherein the compounds containing sulphur are hydrogen sulphide ($H_2S$), carbonyl sulphide (COS), carbonyl disulphide ($CS_2$), or a combination thereof.

3. The catalyst according to claim 1, wherein the specific surface area of the catalyst is from 20 to 140 $m^2/g$.

4. The catalyst according to claim 1, where the catalytically active material is a mixture of CoO and $Co_3O_4$ in a ratio by weight of between 10:1 and 1:10.

5. The catalyst according to claim 1, wherein the cobalt content in the catalyst is comprised from 0.1% to 2% by weight based on the total weight of the support material.

6. A catalyst for selective oxidation or incineration of compounds containing sulphur which are contained in a gas stream, the catalyst consisting of
   a support material comprising clinoptilolite and a binder or agglomerant in an amount from 0% to 99% by weight with respect to the total weight of the support material; and
   a catalytically active material consisting of cobalt oxide, which is supported on said support material; the cobalt content in the catalyst being comprised from 0.1% to 2% by weight based on the total weight of the support material;
where the catalyst has the following properties:
   a specific surface area, measured with nitrogen porosimetry according to the ASTM D-3663 standard year 2003, and using the BET method, comprised from 10 to 150 $m^2/g$;
   a pore volume, measured with mercury intrusion porosimetry according to ASTM D-4284 standard year 2003, comprised from 0.05 to 10 cc/g;
   an average pore diameter, measured with mercury intrusion porosimetry according to ASTM D-4284 standard year 2003, comprised from 2 to 50 nm; and
   a crush strength measured according to the ASTM D-4179 standard year 2002, higher than 29.42 N.

7. Process for the preparation of the catalyst defined in claim 1, comprising the impregnation of a solution of a cobalt salt on the surface of a support material; followed by the drying and calcination of the catalyst.

8. Process for the selective oxidation of compounds that contain sulphur, comprising contacting a gas stream containing the sulphur compounds with a gas stream containing oxygen in the presence of a catalyst defined in claim 1; and a gaseous effluent with a reduced content of $H_2S$ is recovered.

9. Process according to claim 8, where the gas stream containing sulphur compounds is a natural gas, a gas from refinery, a synthesis gas, a tail gas from a process of recovery of sulphur or a gas from a previous partial oxidation of a gas comprising $H_2S$ in which a substantial portion of $H_2S$ was oxidized to elemental sulphur followed by the separation of the same from said elemental sulphur.

10. Process according to claim 8, where said gas stream containing sulphur compounds comprises from 0.01 to 4% of $H_2S$; and the inlet temperature of the gas stream containing the sulphur compounds is 150 to 240° C.

11. Process according to claim 10, where the gas stream containing sulphur compounds is a tail gas from the Claus process.

12. Process according to claim 8, where said gas stream containing sulphur compounds comprises from 0.01 to 4% of $H_2S$; and the inlet temperature of the gas stream containing the sulphur compounds is 210 to 400° C.

13. Process according to claim 12, where the gas stream containing sulphur compounds is from a gas resulting from a previous partial oxidation of a gas comprising $H_2S$ in which a substantial portion of $H_2S$ was oxidized to elemental sulphur followed by the separation of the same from said elemental sulphur.

14. Process according to claim 13, where said previous partial oxidation is carried out according to a process for the selective oxidation of compounds that contain sulphur, comprising contacting a gas stream containing the sulphur compounds with a gas stream containing oxygen in the presence of a catalyst; and a gaseous effluent with a reduced content of $H_2S$ is recovered.

* * * * *